United States Patent
Astarabadi et al.

(10) Patent No.: US 7,277,434 B2
(45) Date of Patent: Oct. 2, 2007

(54) METHOD FOR SIP-MOBILITY AND MOBILE-IP COEXISTENCE

(75) Inventors: Shaun Astarabadi, Laguna Niguel, CA (US); Shinichi Baba, Morristown, NJ (US); Joseph Meilak, Dove Canyon, CA (US); C. Thomas Carr, Orange, CA (US)

(73) Assignee: Toshiba America Information Systems, Inc., Irvine, CA (US)

( * ) Notice: Subject to any disclaimer, the term of this patent is extended or adjusted under 35 U.S.C. 154(b) by 348 days.

(21) Appl. No.: 10/703,278

(22) Filed: Nov. 7, 2003

(65) Prior Publication Data

US 2004/0095932 A1    May 20, 2004

Related U.S. Application Data

(63) Continuation-in-part of application No. 10/299,312, filed on Nov. 18, 2002, now abandoned.

(51) Int. Cl.
   *H04L 12/28* (2006.01)
   *H94Q 7/20* (2006.01)
   *H04J 1/02* (2006.01)
   *H04M 1/00* (2006.01)

(52) U.S. Cl. .................. 370/389; 370/331; 370/338; 370/493; 455/552.1; 455/436; 455/445

(58) Field of Classification Search ............. 455/552, 455/553; 370/351, 389, 395.31, 469, 493; 709/238, 242

See application file for complete search history.

(56) References Cited

U.S. PATENT DOCUMENTS 5,961,607 A * 10/1999 Schaefers ............. 709/249
6,510,159 B1 * 1/2003 Noriyuki ................ 370/401
6,791,949 B1 * 9/2004 Ryu et al. ............... 370/254
6,816,912 B1 * 11/2004 Borella et al. ........... 709/238
2002/0080752 A1 * 6/2002 Johansson et al. ....... 370/338
2004/0122976 A1 * 6/2004 Dutta et al. ............. 709/245
2004/0131078 A1 * 7/2004 Gupta et al. ............ 370/466
2004/0203732 A1 * 10/2004 Brusilovsky et al. ..... 455/426.1

OTHER PUBLICATIONS

E. Wedlund and H. Schlzrinne, "Mobility support using SIP", Second ACM/IEEE International Conference on Wireless and Mobile Multimedia, Seatle, Washington, pp. 1-9, Aug. 1999.*

* cited by examiner

Primary Examiner—Duc M. Nguyen
(74) Attorney, Agent, or Firm—Pillsbury Winthrop Shaw Pittman LLP

(57) ABSTRACT

A wireless electronic device includes a first application to output a first packet through a first virtual interface as a wireless electronic device moves from a home subnetwork to a foreign subnetwork. The wireless electronic device also includes a second application utilizing the Mobile Internet Protocol (Mobile IP protocol) to output a second packet through a second interface as the wireless electronic device moves from the home subnetwork to the foreign subnetwork. A common physical interface is tied to the first virtual interface and the second interface of the wireless electronic device, wherein the physical interface of the wireless electronic device receives the first packet and the second packet, and outputs the first packet and the second packet from the wireless electronic device after the wireless electronic device has moved.

9 Claims, 12 Drawing Sheets

SIP – M Diagram

SIP – M Diagram

| Destination Address | Netmask | Gateway | Interface |
|---|---|---|---|
| 0.0.0.0 | 0.0.0.0 | 66.100.104.1 | 66.100.105.91 |
| 66.100.104.0 | 255.255.252.0 | 66.100.105.91 | 66.100.105.91 |
| 66.100.105.91 | 255.255.255.255 | 127.0.0.1 | 127.0.0.1 |
| 66.255.255.255 | 255.255.255.255 | 66.100.105.91 | 66.100.105.91 |
| 127.0.0.0 | 255.0.0.0 | 127.0.0.1 | 127.0.0.1 |
| 224.0.0.0 | 224.0.0.0 | 66.100.105.91 | 66.100.105.91 |
| 255.255.255.255 | 255.255.255.255 | 66.100.105.91 | 66.100.105.91 |
| Default Gateway: | 66.100.104.1 | | |

Fig. 9(a)

| Destination Address | Netmask | Gateway | Interface |
|---|---|---|---|
| 0.0.0.0 | 0.0.0.0 | 66.100.104.1 | 66.100.105.91 |
| 66.100.104.0 | 255.255.252.0 | 66.100.105.91 | 66.100.105.91 |
| 66.100.105.91 | 255.255.255.255 | 127.0.0.1 | 127.0.0.1 |
| 66.255.255.255 | 255.255.255.255 | 66.100.105.91 | 66.100.105.91 |
| 127.0.0.0 | 255.0.0.0 | 127.0.0.1 | 127.0.0.1 |
| 102.2.45.66 | 255.255.255.255 | 100.100.100.1 | 100.100.100.100 |
| 224.0.0.0 | 224.0.0.0 | 66.100.105.91 | 66.100.105.91 |
| 255.255.255.255 | 255.255.255.255 | 66.100.105.91 | 66.100.105.91 |
| Default Gateway: | 66.100.104.1 | | |

Fig. 9(b)

METHOD FOR SIP-MOBILITY AND MOBILE-IP COEXISTENCE

RELATED APPLICATIONS

This application is a continuation-in-part of U.S. patent application Ser. No. 10/299,312, for Mobility Communication System, filed Nov. 18, 2002.

BACKGROUND

Not long ago, discrete technologies had discrete purposes. Telephones made calls, office-bound computers accessed databases, and personal digital assistants (PDAs) were simple scheduling devices. The changing, and increasingly mobile, needs of business dictated a new strategy because business communications technologies have converged into a flexible array of services that can be accessed through the enterprise and beyond, by almost any device.

Therefore, mobile computing has become more prevalent. In recent years, there has been an increase in the deployment of notebook personal computers (notebook PCs) and PDAs. This deployment is a result of the increasing need for users to be productive in places other than in the office or behind the desk. Companies are requiring more work to be accomplished with less people. Productivity increases are a key metric for wireless return on investment (ROI). Virtual private networks (VPNs) and wired and wireless modems permit secured access to corporate data outside of the office. In addition, deployments of wireless local area networks (W-LANs) are also increasing in schools and corporate campuses.

Public W-LANs are emerging as a viable alternative to circuit-switched or packet-switched cellular data connections. Moreover, the convergence of voice and data on the LAN is rapidly occurring. Several companies are pushing toward the widespread adoption of Internet Protocol (IP) telephony. Many intra-offices and intra-enterprises are now migrating from traditional circuit-switched solutions to traffic that are transported and switched as packets or cells. Moreover, the standards governing Voice over IP (VoIP), such as H.323, Session Initiation Protocol (SIP), Power over Ethernet (or Power over LAN), for example, are being finalized and established, which further promotes acceptance and adoption of packet-based communications.

Personal computers (PCs), PDAs, and other devices are managing more voice and multimedia communications. More telephones are connected to data networks, or LANs, so that in addition to making calls, they can access directory, messaging, and other database information. Whether in and around the office or campus, at home, or somewhere in between, being connected to these voice, data, and other multimedia resources is critical to meeting the new business demands for productivity and responsiveness.

Session Initiation Protocol-MOBILITY (SIP-M) is application layer mobility. SIP-M depends upon a series of SIP exchanges between a Mobile Node (MN), i.e., a wireless electronic device, and its corresponding hosts (CH) to redirect ongoing connections as one or the other endpoints of those conversations changes its point of attachment to the Internet. In SIP-M, the MN is expected to change its IP address whenever it changes its link-layer point of attachment to the Internet. Both the MN and the CH may understand SIP-M, and the MN and CH may use SIP-M to initiate and establish a communication session. Any application the MN and CH are using may also understand, or not care about, having its IP address change while the MN is changing its location. In order to abide by this requirement, the applications supporting SIP-M may be Universal Data Protocol (UDP)—based, or stateless with a retry scheme, such as Hyper Text Transfer Protocol (HTTP). Alternatively, the applications may have a virtual interface to which the applications bind, where the virtual interface never changes its IP address. The actual physical interface may then deliver packets to the virtual interface after decapsulating the packets or modifying the packets.

Mobile Internet Protocol (Mobile IP) is a lower-level protocol. Mobile IP applications utilize Internet Protocol as a transport mechanism, but depend upon link-layer delivery of datagrams at the first and last hop of the transmission. When a MN or wireless electronic device utilizing Mobile IP changes its point of attachment to the Internet, it does not change its IP address. The Mobile Node instructs a router, referred to as a Home Agent (HA) that its Care-of-Address (COA) has changed. The HA then attracts, via proxy address resolution protocol, or intercepts (by virtue of being the default IP router for the MN when the MN is in the home network), the datagrams, i.e. packets, that are to be delivered to the MN or wireless electronic device. The Home Agent encapsulates the datagrams in a wrapper IP packet with a destination address, addressed to, the Care of Address, and transmits the packets to the Care-of-Address.

The machine resident at the Care-of-Address decapsulates the packet and delivers it to the link layer address of the MN. Generally, outgoing packets from the MN are routed normally using IP-layer mechanisms, but in the case where the default router on a foreign network utilizes the IP source address to determine whether or not to route the packet, i.e., engages in source filtering, the packet may be encapsulated and sent back to the Home Agent for outbound delivery, which is referred to as reverse tunneling.

SIP-M and Mobile IP also directly conflict in the authentication mechanism which allows authorization, authentication, and accounting (AAA). AAA is utilized to allow nodes to use foreign network resources. Mobile IP has a built-in AAA protocol called Mobile IP AAA extensions. SIP-M does not have a built-in AAA protocol. In an embodiment, SIP-M may utilize Protocol for carrying Authentication for Network Access (PANA) for AAA. The AAA methodologies of Mobile IP and SIP-M do not easily combine.

Mobile IP does not require application awareness of mobility. Because of this, Mobile IP is impeded in its ability to handle real-time applications, such as Voice over IP (VoIP) calls. Mobile IP permits a wireless PC, wireless PDA, or other mobile node/wireless electronic device to move from one network link to another without interrupting communications. In an organization with W-LAN, a wireless notebook PC may be physically moved from one building to another, into a new sub-network, without interrupting a file download or video stream, and without requiring users to renew their network/IP address.

On the other hand, SIP-M always utilizes the most direct path for packet delivery, and has a shorter handoff cycle, which makes SIP-M more attractive for real-time application mobility. Unlike the traditional telecommunications model that operates via a central switching element, SIP-M allows the control of services, like telephony, to be moved to the endpoints of a network in SIP-based PDA, notebook PC, Tablet PC clients or SIP-based mobile phones. SIP-M is flexible and extensible, and supports many different types of applications, including video, telephony, messaging or instant messaging, and collaboration.

In an embodiment, SIP-M may be utilized for soft-phone applications, and Mobile-IP may be utilized for legacy applications and those which are not sensitive to delay. Accordingly, a need exists for implementing SIP-M and Mobile IP on the same client device.

BRIEF DESCRIPTION OF THE DRAWINGS

FIG. 9(a) illustrates a routing table in a wireless electronic device according to an embodiment of the present invention;

FIG. 9(b) illustrates a routing table with an added routing table entry in a wireless electronic device according to an embodiment of the present invention.

DETAILED DESCRIPTION OF THE INVENTION

Figure 1:
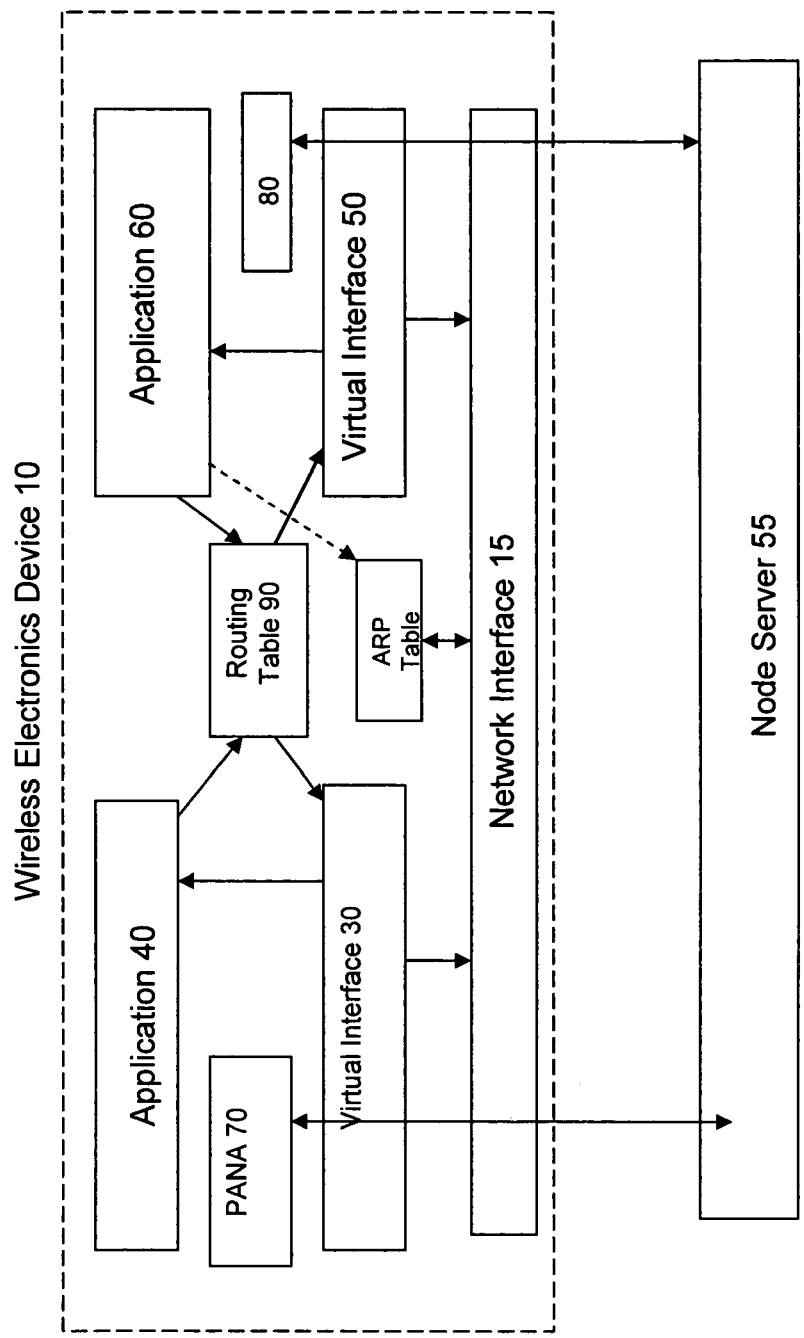
FIG. 1 illustrates a wireless electronic device and a node server according to an embodiment of the present invention.

The present invention relates to an apparatus and a method for providing Mobile IP service and SIP-M service together on a wireless electronic device. FIG. 1 illustrates a wireless electronic device and a node server according to an embodiment of the present invention. The wireless electronic device 10 may include a physical network interface 15, a first virtual interface 30 to interface to applications 40 that are established utilizing a protocol like SIP-M protocol, and a second interface 50 to interface to applications 60 utilizing the Mobile-IP protocol. In one embodiment, the physical network interface 15 may be connected to a single link, e.g., a node server 55, the node server being coupled to a global communications network, such as the Internet.

If the wireless electronic device 10 moves to a new location, e.g., a new subnetwork, applications installed on or running on the wireless electronic device 10 may need to utilize mobility communication protocols, such as SIP-M and/or Mobile-IP to continue and communicate with devices via a local area network or the wide area network. In the wireless electronic device 10, the first virtual interface 30 may be coupled with the physical network interface 15, and the first virtual interface 30 may be utilized for the sending and receiving of a packet or a group of packets by mobility aware applications, e.g., applications established utilizing the SIP-M interface. The packet may be a single packet. The group of packets may also be referred to as a plurality of packets or simply as packets. In an embodiment of the invention, the group of packets (plurality of packets) may have the same destination. Applications established utilizing the SIP-M protocol may use the first virtual interface, which may be bound to a specific IP address during initialization or when moving to a new location. The second interface 50 may be coupled to the physical network interface 15 and the second interface 50 may be utilized for the sending and receiving of packets by other mobility applications, e.g., the Mobile IP interface.

The wireless electronic device 10 may also include an AAA module 70, e.g., a Protocol for carrying Authentication for Network Access (PANA) Authentication module. The AAA module 70 may provide AAA services for applications that may have been established utilizing the SIP-M protocol. In an embodiment of the present invention, the wireless electronic device 10 may include a Mobile IP agent authentication module 80 for AAA services for the wireless electronic device 10 when it has applications utilizing Mobile IP protocol model.

In an embodiment of the invention, the wireless electronic device 10 may include a routing table 90. The routing table 90 directs the packets from either the application established utilizing the SIP-M protocol or the Mobile-IP applications to the first virtual interface 20 or the second interface 50, respectively. The wireless electronic device 10 may also have an address analysis and removing module (not shown) to insert or remove specific IP addresses depending on whether an application established utilizing one of the mobility protocols, e.g., SIP-M and Mobile-IP, is trying to communicate with a device that has an existing communication established using the other mobility protocol.

Figure 2:
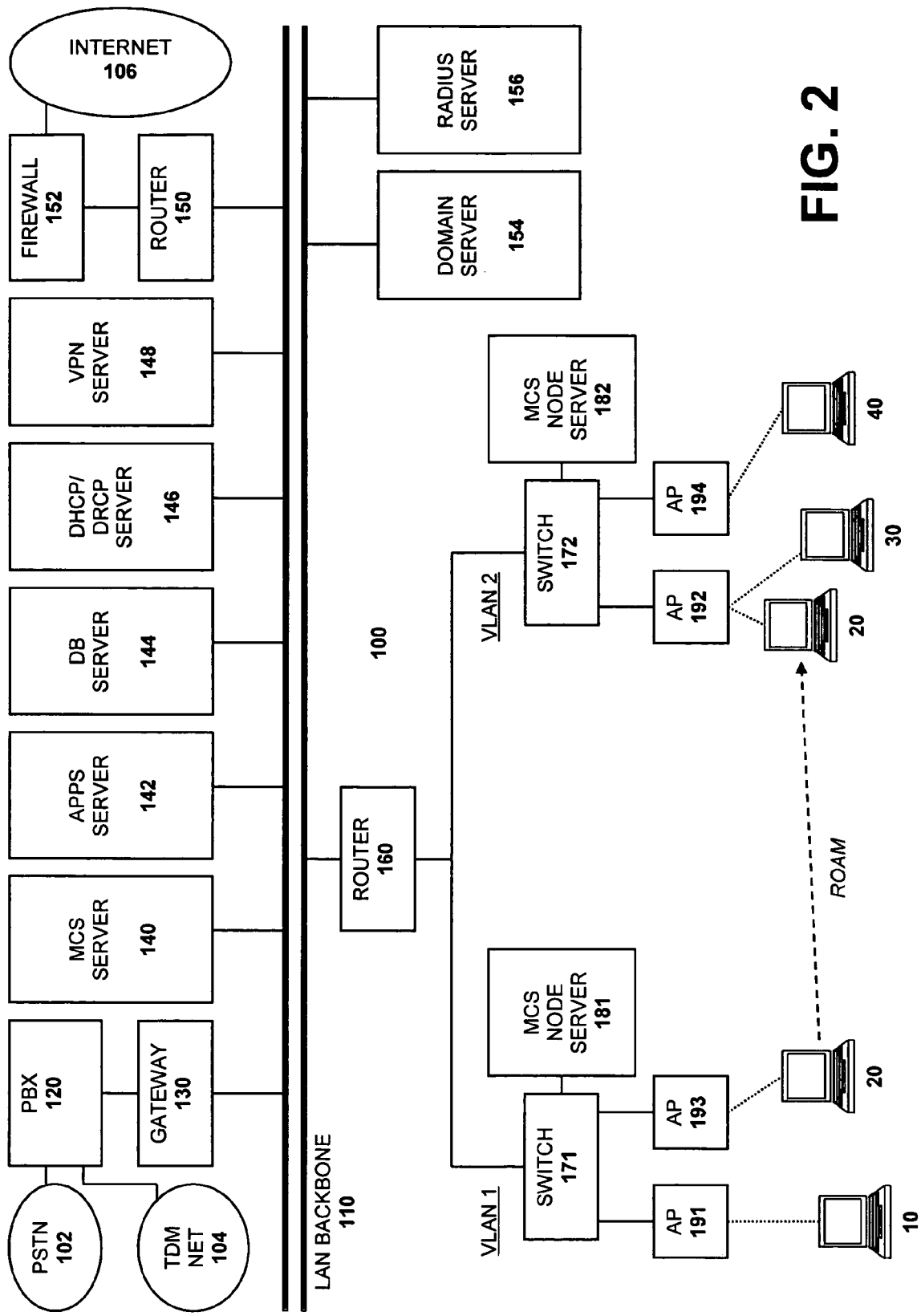
FIG. 2 illustrates a mobility communications system including a plurality of wireless electronic devices according to an embodiment of the present invention.

FIG. 2 illustrates a mobility communications system including a plurality of wireless electronic devices according to an embodiment of the present invention. A local area network (LAN) backbone 110 provides connectivity between the various components of the mobility communications system 100. At the heart of the mobility communications system 100 is the mobility communications system (MCS) server 140, which provides main control over the entire system 100. A private branch exchange (PBX) system 120, such as the Toshiba™Strata-CTX system, is connected to a public switched telephone network 102. The PBX system 120 may also have a connection with a time division multiplexing (TDM) network 104 (also known as digital leased lines). A telecommunications gateway 130, such as a Cisco™ 2600 intelligent media gateway, interconnects the PBX system 120 and the LAN backbone 110. The telecommunication gateway 130 is a liaison to permit communications between two protocols, for example, between the PBX protocol and the Internet Protocol (IP).

The mobility communications system 100 is connected to a wide area network (WAN), such as the Internet 106, via a router 150 and a firewall 152. A virtual private network (VPN) server 148 may be included in the mobility communications system 100 to provide security and encryption/decryption capabilities to the system 100 utilizing, for example, the IP Security (IPSec) protocol. A remote authorization, authentication, and administration (AAA) dial-in user service server 156, e.g., a RADIUS server 156 or a DIAMETER, may be included in the mobility communications system 100 to provide AAA services to users of the system 100. Other authentication protocols and server systems may be implemented as well, and integration with other authentication protocols, such as the DIAMETER protocol for example, may be implemented. The AAA services on the AAA servers, e.g., the RADIUS or DIAMETER servers, may also be housed in the same physical server that is providing the MCS server 140.

Furthermore, a domain server 154 may be included in the mobility communications system 100 to facilitate access to and from the WAN, such as the Internet 106. An applications server 142 may be included in the mobility communications system 100 to store and provide applications to the system 100. A database server 144 may also be included in the mobility communications system 100 to provide database storage and functionality to the system 100. A dynamic host configuration protocol (DHCP) and/or a dynamic rapid configuration protocol (DRCP) server 146 may be connected to the LAN backbone 110 to assign IP addresses to the nodes of the network. In an alternative embodiment of the present invention, the DHCP or DRCP server 146 may be resident in a node server in the local subnet, e.g., first node servers 181 and 182.

A plurality of wireless electronic devices 10, 20, 30 and 40 may communicate wirelessly with the mobility communication system 100 via a wireless protocol. The wireless electronic devices 10, 20, 30, 40 communicate wirelessly with access points 191, 192, 193, 194, which are preferably radio frequency (RF) transceivers, for example, and which are in communication with a node server 181, 182 via a switch 171, 172. In one embodiment of the invention, the switch 171, 172 may be connected to a router 160 through the LAN backbone 110. In an alternative embodiment of the invention, the first node server 181 and 182 may be connected to the router 160 through the LAN backbone.

The switch 171, first node server 181, access points 191, 193, and wireless electronic devices 10, 20 (before roaming) form a first sub-network, or virtual local area network (VLAN 1). The switch 172, second node server 182, access points 192, 194, and wireless electronic devices 20 (after roaming), 30, 40 form a second sub-network, or virtual local area network (VLAN 2).

The router 160 may be one physical server. The router 160 may be configurable so that one section of the router 160 may provide routing services for a first sub-network and a second section of the router 160 may provide routing services for a second sub-network.

In an embodiment of the present invention, the first node server 181 and the second node server 182 may each be connected to the LAN backbone 110. This configuration may be utilized due to Quality of Service (QoS) functionality and other routing needs.

Each wireless electronic device 10, 20, 30, 40 may be authenticated, accounted, and authorized, i.e., AAA services are provided, by the MCS server 140, which relays this information (e.g., via certificates) to the first node server 181 and the second node server 182. Accordingly, when a wireless electronic device 20 moves/roams from one sub-network to another, the wireless electronic device 20 may need to communicate and re-authenticate with the corresponding first node server 181 or second node server 182, and the communication path may not need to communicate back to the MCS server 140 across the LAN backbone 110. The Protocol for carrying Authentication for Network Access (PANA), may be utilized to provide authentication, accounting, and authorization (AAA) services to authenticate clients (i.e., wireless electronic devices) when they roam. PANA is a Layer 3 network authentication protocol that supports secure authentication over wireless connections. PANA supports seamless roaming between sub-networks and between W-LAN and cellular packet-based networks as well.

According to an embodiment of the invention, the wireless electronic devices 10, 20, 30, and 40 may utilize an application established utilizing the Session Initiation Protocol-Mobile. (SIP-M) for voice communications, and may utilize the Mobile Internet Protocol (Mobile IP) protocol-based application for data communications. Integration of both the SIP-M and Mobile IP protocols provide greater flexibility to the roaming capabilities of the wireless electronic devices 10, 20, 30 and 40.

A wireless electronic device may sense or determine mobility in a variety of manners. In other words, a wireless electronic device may determine if it has moved from one subnetwork to another by receiving a solicitation or by transmitting an advertisement, for example. If the wireless electronic device 20 is utilizing the Mobile IP protocol, e.g., in an application not needing real-time communication, to communicate, mobility agents, i.e., home agents and/or foreign agents, may be utilized to support communications from the wireless electronic device. The mobility agents may include at least one home agent and at least one foreign agent.

Figure 3:
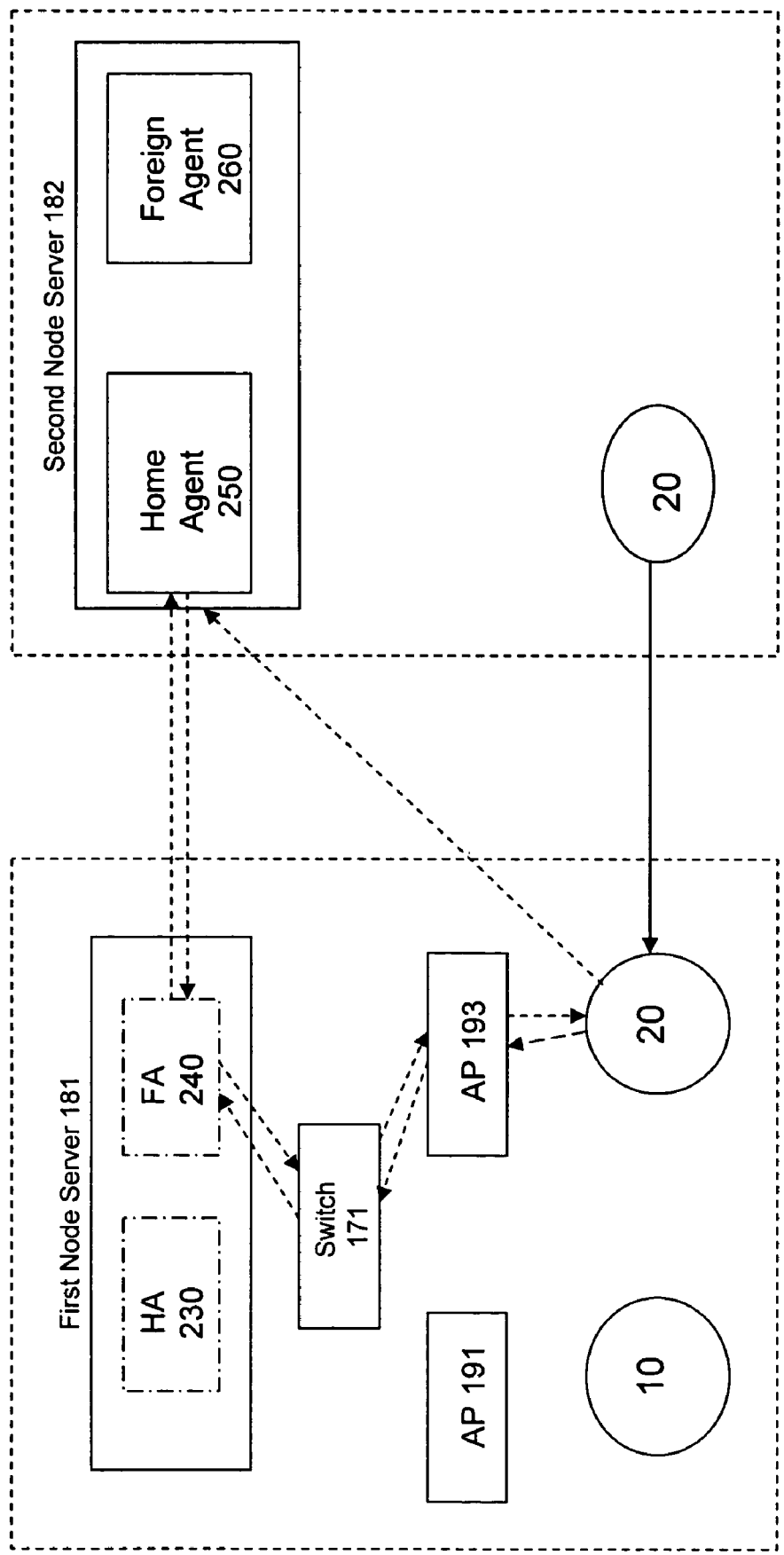
FIG. 3 illustrates home agents and foreign agents on a network according to an embodiment of the present invention.

When wireless electronic devices move from one location to another, e.g., from one subnetwork to another, mobility services may be required. Applications established utilizing SIP-M may have to follow one set of procedures. Applications utilizing the Mobile IP protocol may follow a second set of procedures. FIG. 3 illustrates a wireless electronic device with an application utilizing the Mobile IP protocol moving from one location to a second location according to an embodiment of the present invention. A home agent 250 may be located in one of the plurality of node servers 182 that reside on the LAN backbone 110 (see FIG. 2). The home agent 250 may be originally assigned where the wireless electronic device 20 logs onto the network 100 (see FIG. 2). In alternative embodiments, the home agent 250 may be assigned when a wireless electronic device is using mobility services. A node server 182 may also include a foreign agent 260. The wireless electronic device 20 may roam into an area including an access point 191 or 193 that is coupled to the first node server 181. The wireless electronic device 20 may utilize the foreign agent 240 located within the first node server 181 as an interface when the user wireless electronic device 20 is within the area under control of the first node server 181.

When utilizing the Mobile IP protocol, the wireless electronic devices 10 and 20 may need to determine if they are in their home subnetwork 220 or if they have roamed to a foreign subnetwork 210. Under certain operating conditions, the home agent 230 and the foreign agent 240 in the foreign subnetwork may send out advertisement signals indicating that the respective home agent 230 or the foreign agent 240 may be utilized as a node for connecting the wireless electronic device 10 or 20 to a communications network, e.g., the LAN backbone 110, and consequently the Internet 106. In an embodiment of the invention, the home agents 230 and 250, and the foreign agents 240 and 260 may advertise their presence via Agent Advertisement messages. As illustrated in the FIG. 3 embodiment of the invention, the home agent 230 and the foreign agent 240 may be located in the node server 181, and the home agent 250 and the foreign agent 260 may be located in the node server 182. The home agent 230 and the foreign agent 240 may transmit agent advertisement messages from within the node server 181 and the home agent 250 and the foreign agent 260 may transmit advertisement messages from within the node server 182.

Illustratively, the wireless electronic device 20 may reside, or be originally configured, in home subnetwork 220. The wireless electronic device 20 may receive a home agent advertisement message from the home agent 250. Based on the receiving of the home agent advertisement message, the wireless electronic device 20 may identify that the wireless. electronic device 20 has not moved from its home subnetwork 220. Under these operating conditions, the wireless electronic device 20 does not operate utilizing mobility services. Under these operating conditions, the wireless electronic device 20 may not register with a home agent 250.

Under the operating condition where the wireless electronic device 20 was registered in another subnetwork, but is returning to its home subnetwork 220, which is the wireless electronic device's 20 home network, the wireless electronic device 20 may deregister with its home agent 250, again identifying that the wireless electronic device does not need to utilize mobility services. The wireless electronic device 20 may deregister with the home agent 250 on the home subnetwork 220 by use of a registration request message, e.g., a deregistration request message. The home agent 250 may reply with a registration reply message, e.g., a deregistration reply message.

Under other operating conditions, the wireless electronic device 20 may move or roam from the home subnetwork 220 to the foreign subnetwork 210, as illustrated in FIG. 3. Under certain operating conditions, the wireless electronic device 20 may register with a home agent 250 in its home subnetwork 220 before roaming. The wireless electronic device 20 may no longer receive a home agent advertisement message for the home subnetwork 220 because the wireless electronic device 20 has moved to a new physical location. The foreign agent 240 residing within the first node server 181 may be transmitting a foreign agent advertisement signal identifying that connection to a communications network is possible for wireless electronic devices, such as wireless electronic device 20, that have roamed into the foreign subnetwork 210.

The agent advertisement signals, whether they are home agent advertisement signals or foreign agent advertisement signals, may be transmitted in an Internet Control Message Protocol (ICMP) packet and may be transmitted according to the ICMP.

Alternatively, as illustrated in FIG. 3, if the wireless electronic device 20 has roamed from the home subnetwork 220 to the foreign subnetwork 210, the wireless electronic device 20 may transmit a solicitation signal identifying that the wireless electronic device 20 is requesting a connection point to the communications network, e.g., LAN backbone 110, and hence the Internet 106. This may be referred to as an agent solicitation message. In this example, because the wireless electronic device 20 has roamed to the foreign subnetwork 210, the wireless electronic device 20 may be soliciting for a foreign agent, e.g., foreign agent 240.

In response to the solicitation signal, e.g., foreign agent solicitation message, from the wireless electronic device 20, the foreign agent 240 may transmit an advertisement signal identifying that the wireless electronic device 20 may connect to the communications network 110 via the foreign agent 240. The communication may be referred to as a signal, but the communication may take place utilizing packets, such as ICMP packets.

The wireless electronic device 20 may receive the foreign agent's 240 advertisement signal. The foreign agent's advertisement signal may include an Internet Protocol (IP) address from the foreign agent 240. The wireless electronic device 20 may utilize the IP address and a prefix link included in the advertisement packet from the foreign agent 240.

Once the wireless electronic device 20 has determined it has moved to a new subnetwork, i.e., receives the foreign agent advertisement signal, the wireless electronic device 20 may obtain a Care-Of-Address (COA) on the foreign subnetwork 210. The COA may be assigned or designated in a variety of manners. Under certain operating conditions, the wireless electronic device 20 may determine the COA from the foreign agent advertisement signal. The COA may be the IP address of the foreign agent 240 in the foreign subnetwork 210. Under other operating conditions, the wireless electronic device 20 may determine the COA from an external assignment mechanism, e.g., Dynamic Host Configuration Protocol (DHCP). This may be referred to as a co-located COA.

The wireless electronic device 20 may transmit the COA to the wireless electronic device's 20 home agent 250 on the home subnetwork 220. Illustratively, the wireless electronic device 20 may transmit a registration request message to the home agent 250, identifying the COA on the foreign subnetwork 210. The home agent 250 on the home subnetwork 220 may complete this transaction by transmitting a reply message. Under certain operating conditions, the home agent 250 may transmit a registration reply message. As illustrated by the dotted lines in FIG. 3, in embodiments of the invention, the wireless electronic device 20 may utilize the foreign agent 240 on the first subnetwork 210 in transmitting the registration message and the home agent 240 on the second subnetwork 220 may also utilize the foreign agent 240 in transmitting the reply message to the wireless electronic device 220.

In an embodiment of the invention with an application utilizing the Mobile IP protocol, data communications between a communicating device and the wireless electronic device may initiate at the communicating device. The data packets are transmitted to the original IP address of the wireless electronic device, i.e., the IP address for the wireless electronic device 20 in its home subnetwork 220. The home agent 250 monitors communications for the wireless electronic device and intercepts the data packets. The home agent 250 redirects the packets to the foreign agent 240 on the foreign subnetwork 210 and on to the wireless electronic device. This may be referred to as tunneling of the data.

Under certain operating conditions, a wireless electronic device 20 may return to its home subnetwork. Upon return, the wireless electronic device 20 may deregister with its home agent 250 in its home subnetwork 220. Thus, it may assume receipt of packets that the home agent 250 was tunneling utilizing the care-of address for the wireless electronic device 20.

Figure 4:
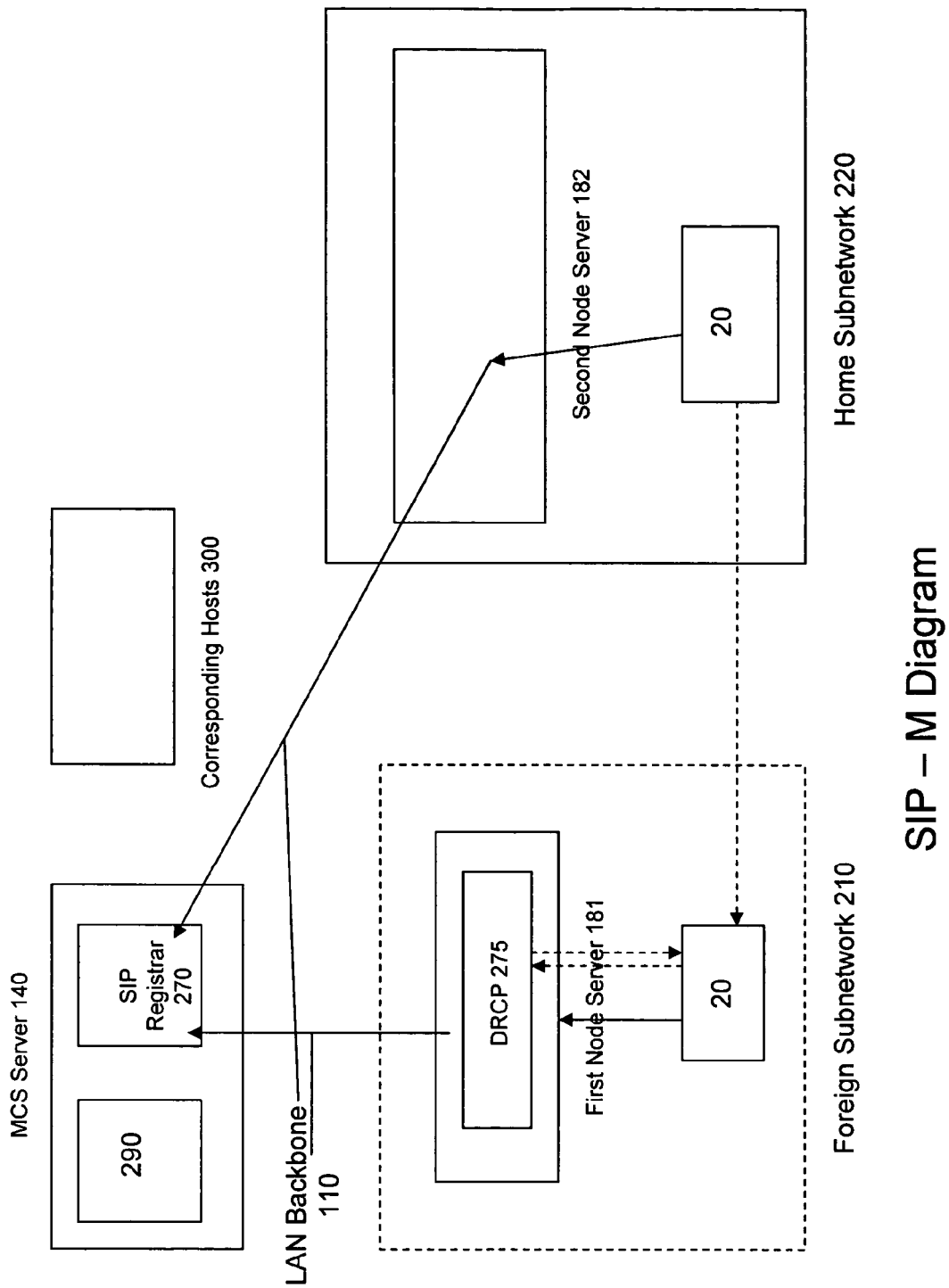
FIG. 4 illustrates a wireless electronic device establishing a communication session utilizing the SIP-M protocol according to an embodiment of the present invention.

FIG. 4 illustrates a wireless electronic device 20 establishing a communication session utilizing an application established utilizing the SIP-M protocol after roaming to a new location according to an embodiment of the present invention. The wireless electronic device 20 may utilize the Session Initiation Protocol-Mobility (SIP-M) protocol to initiate and establish a communication session with a communicating device, i.e., corresponding host 300, or to have a communication session initiated and established from the corresponding host 300 to the wireless electronic device 20.

Once the wireless electronic device 20 is initialized, the wireless electronic device 20 may register with a SIP registrar 270. The wireless electronic device 20 may provide the SIP registrar 270 with its IP address, which identifies the subnetwork in which the wireless electronic device 20 may be initially located, i.e., its home subnetwork. The SIP registrar 270 may be located in the MCS server 140 (see FIG. 2). In an embodiment of the invention illustrated in FIG. 4, the wireless electronic device 20 may communicate with the SIP registrar 270 in the MCS Server 140 through a wireless access point 192, a switch 172, and the LAN backbone 110, but the wireless access point 192, a switch 172, and the LAN backbone 110 are not illustrated in FIG. 4. The SIP registrar 270 keeps track of the location of SIP-enabled devices within the plurality of subnetworks on the Local Area Network backbone 110.

The wireless electronic device 20 may move or roam from one subnetwork to another subnetwork. As illustrated in FIG. 4, the wireless electronic device 20 may move from the home subnetwork 220 to the foreign subnetwork 210. In order to communicate on the foreign subnetwork 210, the wireless electronic device 20 may need to procure a new IP address. Under certain operating conditions, the wireless electronic device 20 may receive a DRCP advertisement inviting the wireless electronic device 20 to receive an IP address from the DRCP server 275. In an embodiment of the present invention, the DRCP server 275 may be located on the MCS node server 181 in the foreign subnetwork 210. In an embodiment of the invention, the DRCP server 275 may be located with a foreign agent 240 (see FIG. 3) on the MCS node server 181. In another embodiment of the invention, the DRCP server 275 may be located on a separate server from the foreign agent 240.

Although not illustrated in FIG. 4, the wireless electronic device 20 may communicate with the MCS node server 181 via the wireless access point and a switch. Under alternative operating conditions, the wireless electronic device 20 may send a DRCP request to the DRCP server 275 requesting that it be allocated an IP address for use in the foreign subnetwork 210. Under either operating condition, the wireless electronic device 20 may end up with a new IP address for use in the foreign subnetwork 210.

After procuring the new IP address for use in the foreign subnetwork 210, the wireless electronic device 20 may notify the SIP registrar 270 in the MCS server 140. The wireless electronic device 20 may provide the SIP registrar 270 with its new IP address. The MCS server 140 may also include a SIP server 290. The SIP server 290 may be a proxy server or a redirect server. The proxy server operation is further discussed below.

Figure 5:
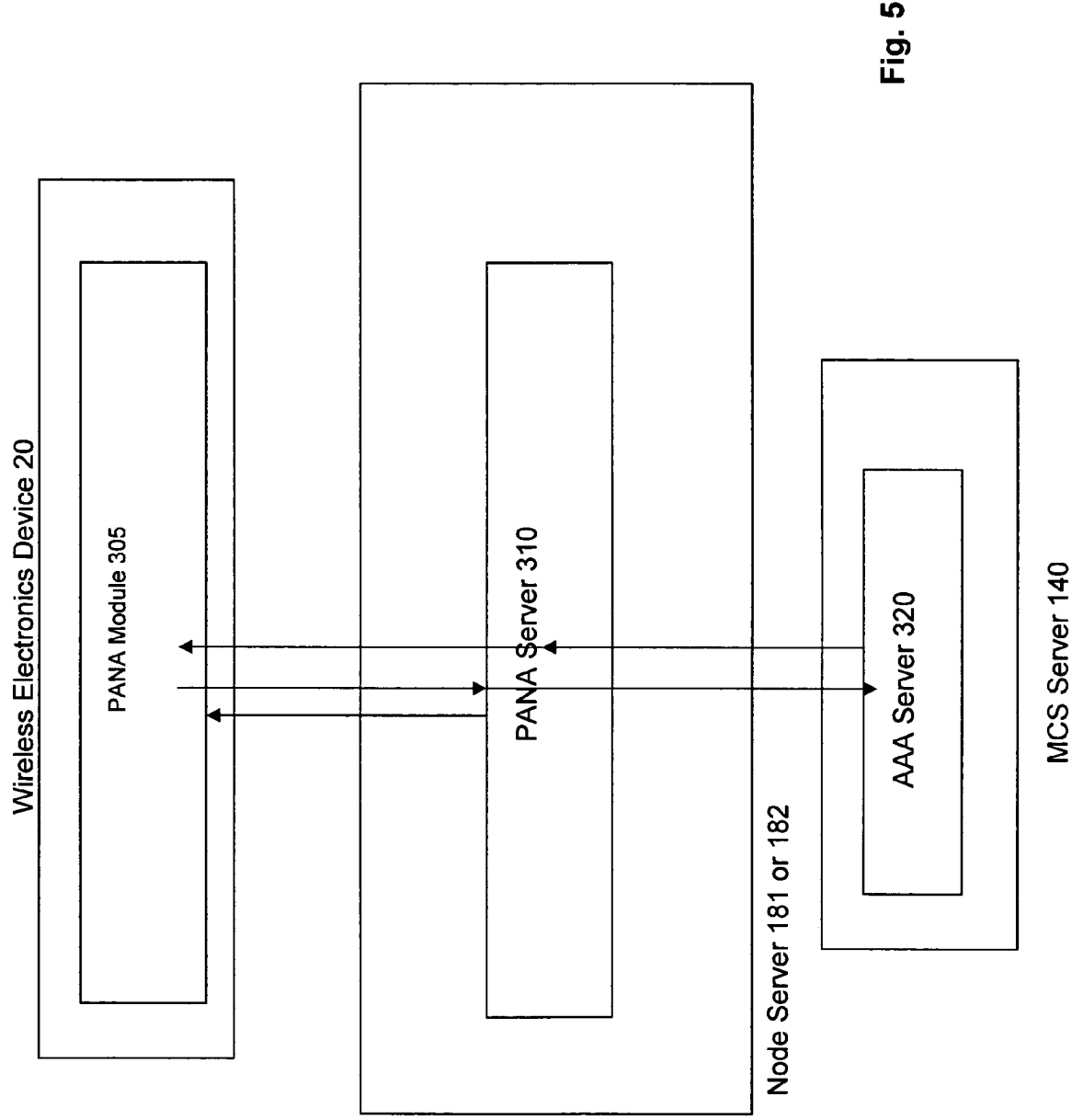
FIG. 5 illustrates authentication of the wireless electronic device under the SIP-M protocol.

FIG. 5 illustrates authentication of the wireless electronic device utilizing the SIP-M protocol according to an embodiment of the present invention. An application on the wireless electronic device 20 that has been established utilizing the SIP-M protocol may also need to be authenticated. The wireless electronic device 20 may communicate with a Protocol For Carrying Authentication for Network Access (PANA) server 310 for authentication. A PANA module 305 resident within the wireless electronic device may communicate with the PANA server 310. The PANA server 310 may be located in a node server 181 or 182, as illustrated by FIG. 5. The PANA server 310 may also be referred to as a DIAMETER or RADIUS Network Access Server. Under certain operating conditions, the PANA server 310 may provide a rapid authentication of the wireless electronic device 20. Under other operating conditions, the PANA server 310 may communicate with an AAA server 320, e.g., DIAMETER server 320, via the LAN backbone 110 in order to complete authentication. In embodiments of the invention, as illustrated in FIG. 5, the DIAMETER server 320 may be located in the MCS Server 140. In this embodiment, the DIAMETER server 140 may provide the authentication acceptance directly to the wireless electronic device 20. The wireless electronic device 20 may not be able to communicate until it has been authenticated.

A corresponding host 300 (see FIG. 4) may attempt to communicate with a wireless electronic device 20 utilizing an application established utilizing the SIP-M protocol. As discussed previously, the initial establishment of the communication session between the corresponding host 300 and the wireless electronic device 20 may take place utilizing the SIP-M protocol. The corresponding host 300 and the wireless electronic device 20 may agree to communicate and then determine the ports that may be utilized for the established communication session. After the communication session has been established, the corresponding host 300 and the wireless electronic device 20 may communicate via a variety of codex voice streams. The telecommunications encoding protocols utilized may include Realtime Transport Protocol (RTP), G711, or G729.

Figure 6:
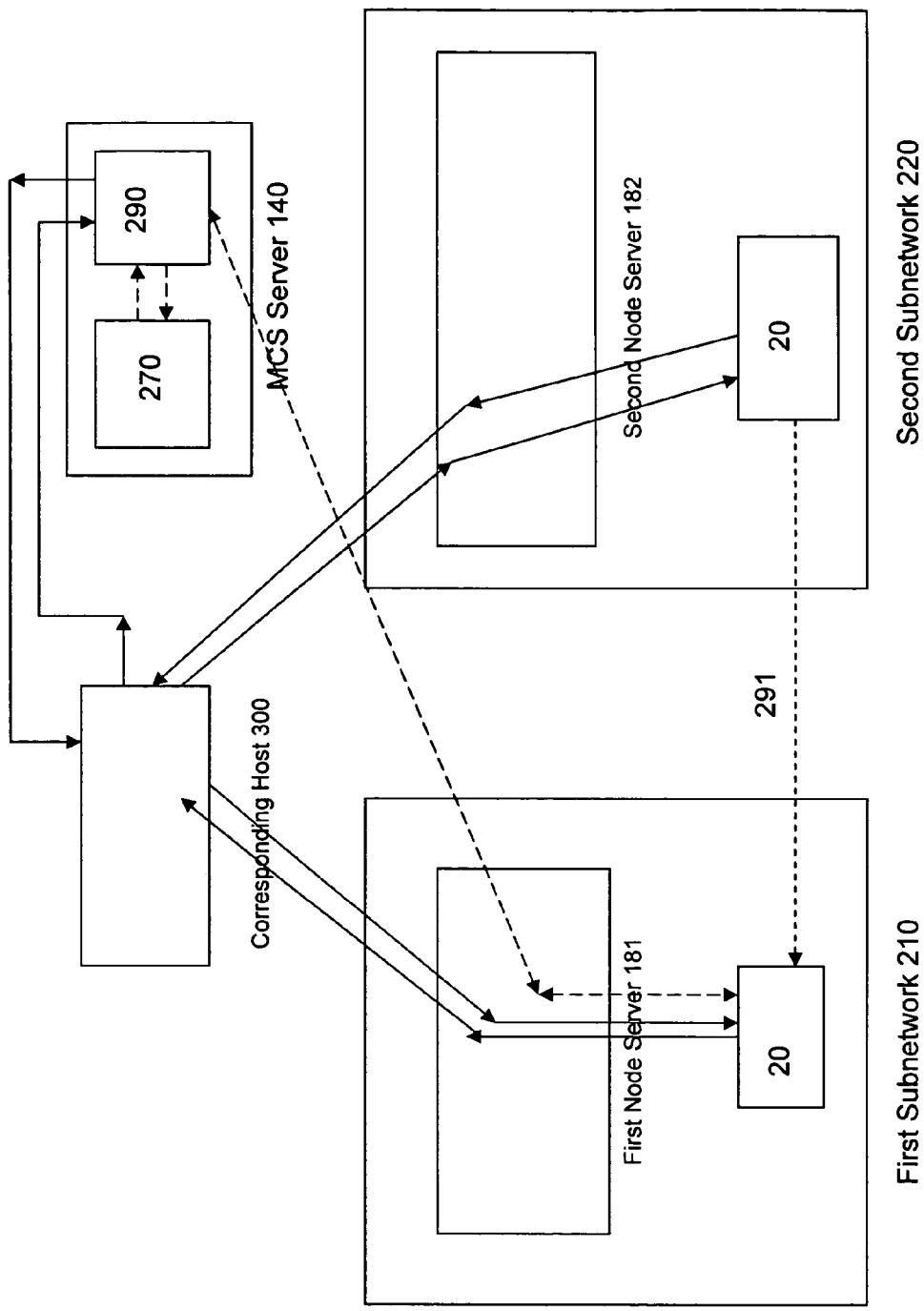
FIG. 6 illustrates a corresponding host communicating to a wireless electronic device utilizing the SIP-M protocol according to an embodiment of the invention.

FIG. 6 illustrates a corresponding host communicating to a wireless electronic device utilizing an application established using the SIP-M protocol according to an embodiment of the invention. If the corresponding host 300 attempts to contact the wireless electronic device 20 utilizing an application established under the SIP-M protocol when the wireless electronic device 20 is in its home, i.e., second subnetwork 220, the corresponding host 300 may contact the wireless electronic device 20 via the SIP server 290. Illustratively, the corresponding host 300 may send a message to the wireless electronic device 20 utilizing an identifier such as shaun@tais.toshiba.com. Under other operating conditions, the corresponding host 300 may attempt to contact the wireless electronic device 20 utilizing the wireless electronic device's 20 IP address. In an embodiment where the corresponding host utilizes an identifier, if the wireless electronic device 20 is in its home network, the SIP server 290 may utilize the SIP Registrar 270 to identify the wireless electronic device's 20 IP address. After the SIP server 290 has determined the wireless electronic device's 20 IP address, the data or packets of the communication may be directed to the wireless electronic device's 20 IP address.

If the corresponding host 300 attempts to contact the wireless electronic device 20 after the wireless electronic device 20 has moved to a new subnetwork, the SIP server 290 may identify that the wireless electronic device 20 has moved to a new subnetwork, e.g., the foreign subnetwork 210, as illustrated by the dotted line 291 in FIG. 6. The SIP server 290 may access the SIP registrar 270 to identify the new IP address for the wireless electronic device 20. If the SIP server 290 is acting as a proxy server, the SIP server 290 may transfer the SIP invite message to the wireless electronic device 20 at its new IP address in the new subnetwork, e.g. the foreign or first subnetwork 210. The wireless electronic device 20 may respond to the SIP invite message by sending a SIP acknowledgement to the communicating device 300. After the corresponding host 300 receives the SIP acknowledgment, the corresponding host 300 and the wireless electronic device 20 may start to communicate via the chosen telecommunications voice stream protocol. The voice data passed between the communicating device 300 and the wireless electronic device 20 may not pass through the SIP server 290. In other words, the SIP server 290 is only utilized to establish the communication session and not to transfer the data of the communication session.

Under certain operating conditions, a corresponding host 300 or a plurality of corresponding hosts 300 may have an ongoing voice data communication with the wireless electronic device 20 when the wireless electronic device 20 moves or roams to a new subnetwork, i.e., the foreign or first subnetwork 210. After the wireless electronic device 20 has obtained a new IP address and been authenticated in the foreign subnetwork 210, the wireless electronic device 20 may transmit a series of SIP reinvite messages to the at least one corresponding host 300 identifying that it has a new IP address. The at least one corresponding host 300 may then transmit a SIP acknowledgement message to the wireless electronic device 20. The corresponding host 300 may them modify the IP address of the outgoing voice stream data packets to include the wireless electronic device's 20 new IP address.

Figure 7:
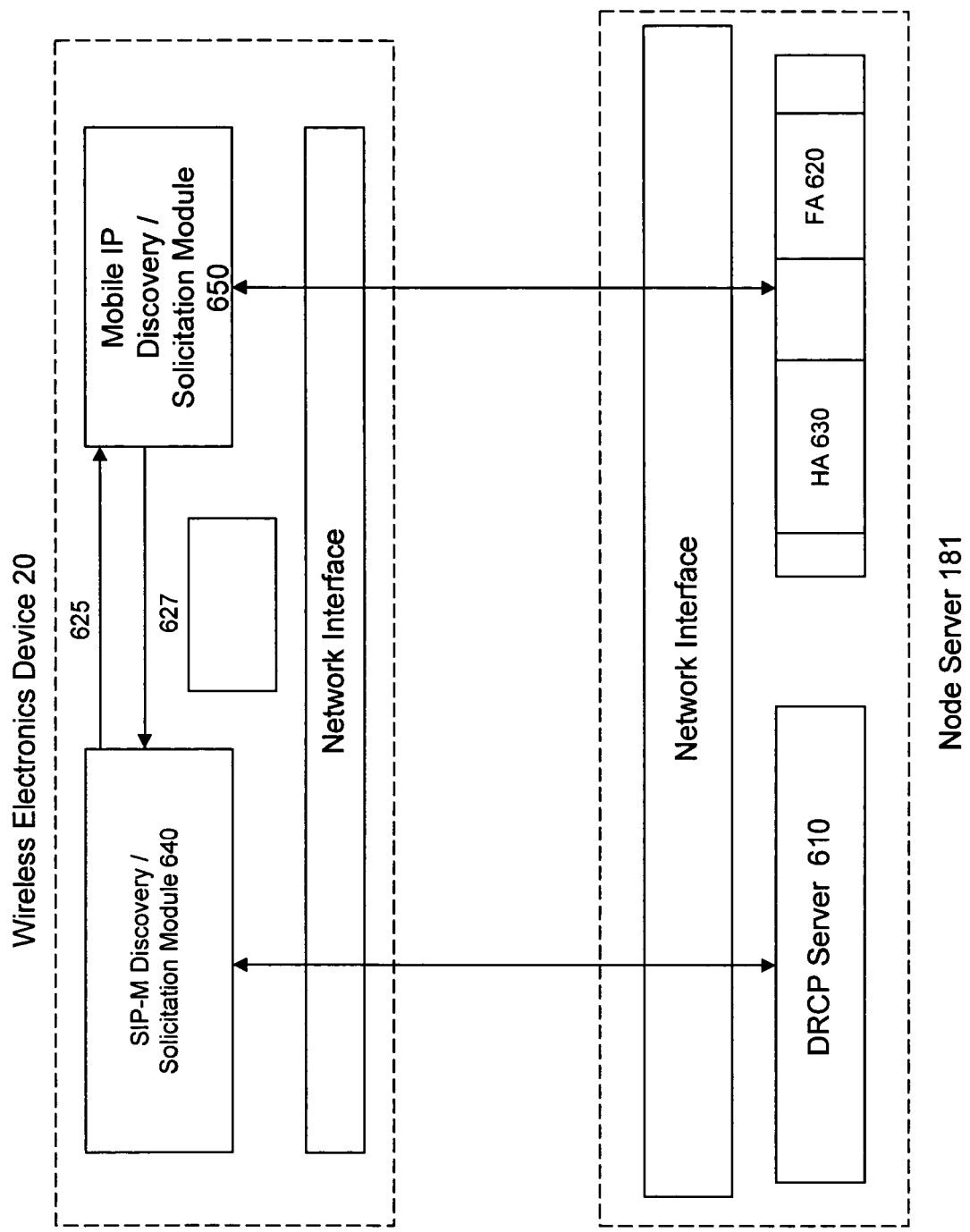
FIG. 7 illustrates an automatic activation of the unused virtual interface according to an embodiment of the invention.

Under certain circumstances it may be advantageous to initialize the other mobility interface once one of the mobility interfaces has been enabled. FIG. 7 illustrates the automatic activation of the unused interface according to an embodiment of the invention. Because the wireless electronic device 20 is capable of communicating utilizing the Mobile-IP protocol or utilizing a voice communication protocol, where the voice communication session was originally established utilizing the SIP-M protocol, the operation of the wireless electronic device 20 may benefit by initializing the other interface. In other words, if the first virtual interface is established, e.g., SIP-M, then it may be beneficial to initiate the other interface, e.g., the Mobile IP interface, for the wireless electronic device 20.

Under certain operating conditions, the wireless electronic device 20 may be establishing communications with an IP address server, e.g., a DRCP server 610, utilizing the SIP-M protocol. For example, ff the wireless electronic device 20 receives an advertisement from the DRCP server 610, indicating the DRCP server 610 may provide it an IP address, the wireless electronic device 20 may transmit an agent solicitation message to a mobile IP agent, e.g., foreign agent 620, in the node server 181. The wireless electronic device 20 may also identify a roaming event, i.e., a new connection to the wireless electronic device or a notification that the wireless electronic device 20 has moved, and may attempt to obtain an IP address from the DRCP server 610. In one embodiment of the invention illustrated in FIG. 7, the SIP-M Client Discovery/Solicitation module 640 in the wireless electronic device 20 may send a message via path 625 to the Mobile IP Agent Discovery/Solicitation module 650 to instruct the Mobile IP Agent Discovery/Solicitation module 650 to send an advertisement to the Mobile IP agent, e.g., foreign agent 620, to attempt and obtain an IP address to utilize for communications under the Mobile IP protocol.

Alternatively, if the wireless electronic device 20 receives an advertisement from the Mobile IP agent, e.g., foreign agent 620, the wireless electronic device 20 may transmit an IP address solicitation, e.g., DRCP solicitation, to the DRCP server 610. Illustratively, in an embodiment of the invention illustrated in FIG. 7, the MIP Agent Discovery/Solicitation module 650, upon receiving an advertisement from a Mobile IP agent 620, the Mobile IP Agent Discovery/Solicitation module 650 may send along path 627 a message or notification signal to the DRCP Client/Discovery module 640 to instruct the DRCP Client/Discovery module 640 to obtain an IP address from the DRCP server 610. Other types of interface technologies, e.g., RF sensors, may be utilized to more quickly initiate the solicitation action.

Figure 8A:
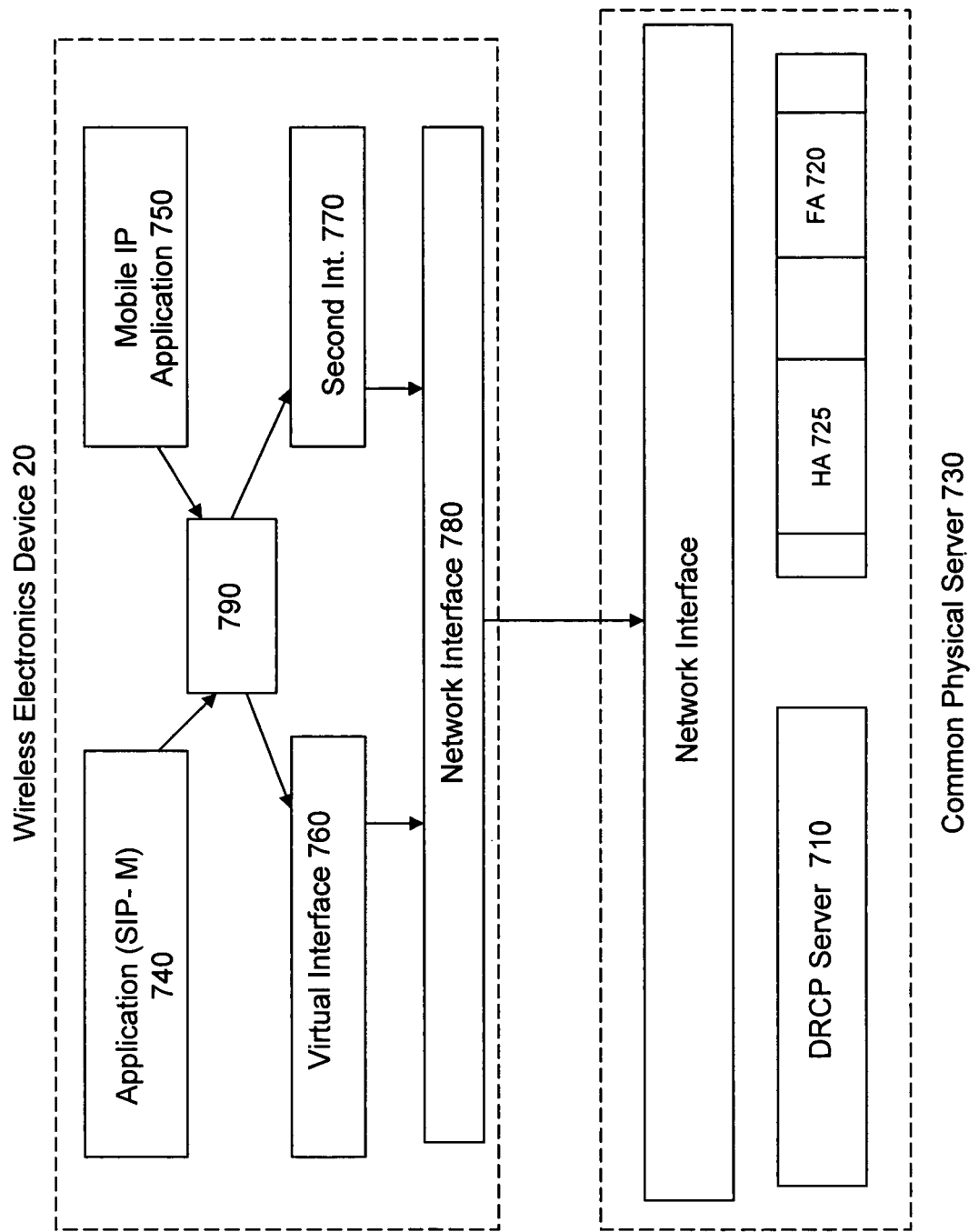
FIG. 8(a) illustrates the outbound transmission of packets from a wireless electronic device to a physical server serving both a foreign agent and the DRCP server accordingly to an embodiment of the invention.

FIG. 8(*a*) illustrates the outbound transmission of packets or datagrams from a wireless electronic device 20 including applications utilizing the Mobile IP protocol and applications established utilizing the SIP-M protocol according to an embodiment of the present invention. In an embodiment of the invention, the foreign agent 720 and the DRCP server 710 may be served out of a common physical server 730, e.g., the node server 181. In this embodiment, the IP address for the foreign agent 720 and the DRCP server 710 may be the same. In an alternative embodiment of the invention illustrated in FIG. 8(*b*), the foreign agent 720 may be in a second server 810 and the DRCP server 710 may be located in the first server 800.

FIG. 8(*a*) illustrates the outbound transmission of packets from a wireless electronic device to a physical server 730 serving both a foreign agent 720 and the DRCP server 710 accordingly to an embodiment of the invention. The common physical server 730 may include or serve a DRCP server 710 and a foreign agent 720. Therefore, the DRCP server 710 and the foreign agent 720 may share the same IP address.

The transmission of packets or datagrams from the wireless electronic device 20 may be transmitted out of the same physical interface 780. Applications 740 established utilizing the SIP-M protocol may transmit the packets or datagrams through a first virtual interface 760 to the physical network interface 780. Mobile-IP applications 750 may transmit the packets or datagrams through a second interface 770 to the physical interface 780. In an embodiment of the invention utilizing the Ethernet protocol to communicate on the LAN backbone, the physical interface may utilize an address resolution protocol table (see FIG. 1) to obtain the Media Access Control (MAC) address corresponding to the IP address necessary for the Mobile-IP application 750 or the application 740 established utilizing the SIP-M protocol. The physical interface 780 encapsulates the packets and utilizes the MAC address corresponding to the IP address as the destination address in order for the packets to be transmitted to the correct device. Applications 740 established utilizing the SIP-M protocol may be bound to a given IP address for the wireless electronic device 20 to ensure that the correct source IP address is on the application's packets.

A routing table 790 located in the wireless electronic device 20 may determine the next hop or the next destination of the datagrams or packets transmitted from application 740, the application established utilizing the SIP-M protocol. The routing table 790 may identify the next hop that the datagrams or packets may take. In this embodiment, the next hop may be the DRCP 710 server on the common physical server 730. An illustrative routing table 790 is shown in FIG. 9(*a*). In this example, the IP address for the corresponding host, i.e., receiving device, is 100.100.100.23. Because the routing table 790 does not include an entry corresponding to the corresponding host's IP address, i.e., the destination address of the packets or datagrams, the packets or datagrams may be transmitted to the default gateway, which is the IP address of common physical server 730. In this example, the default gateway may be 66.100.104.1, as illustrated in FIG. 9(*a*).

Referring again to FIG. 8(*a*), a Mobile-IP application 750 may transmit packets or datagrams through a second interface 770 and through a physical network interface 780. The routing table 790 may identify the next hop that the Mobile IP application packets or datagrams may take. In this embodiment, the next hop for Mobile-IP application packets may be the common physical server 730. Because the foreign agent 720 is located on the common physical server 730 along with the DRCP server 710, the foreign agent 720 has the same IP address as the DRCP server 710. In some cases, the routing table 790 may not have a destination address entry corresponding to the corresponding host's IP address, and the packets or datagrams may be transmitted to the default gateway, which again may be the IP address of the common physical server 730.

In an embodiment of the invention where the DRCP server 710 and the home agent server 725 are included on a common physical server, the ARP table may be modified when the wireless electronic device 20 enters the foreign subnetwork. The default route in the routing table 790 may be the IP address of a new server or a third server (not shown). The wireless electronic device, rather than modifying the default route in the routing table, may instead either install a new entry in the ARP table or modify an existing entry in the ARP table. The new or modified ARP table entry may map the IP address corresponding to the new or third server to the MAC address of the second server. In other words, when the packets reach the physical interface in the wireless electronic device 20, the physical interface may check the ARP table and because it has been modified with the MAC address of the second server, i.e., the common physical server, the packets may be transmitted to the common physical server.

Figure 8B:
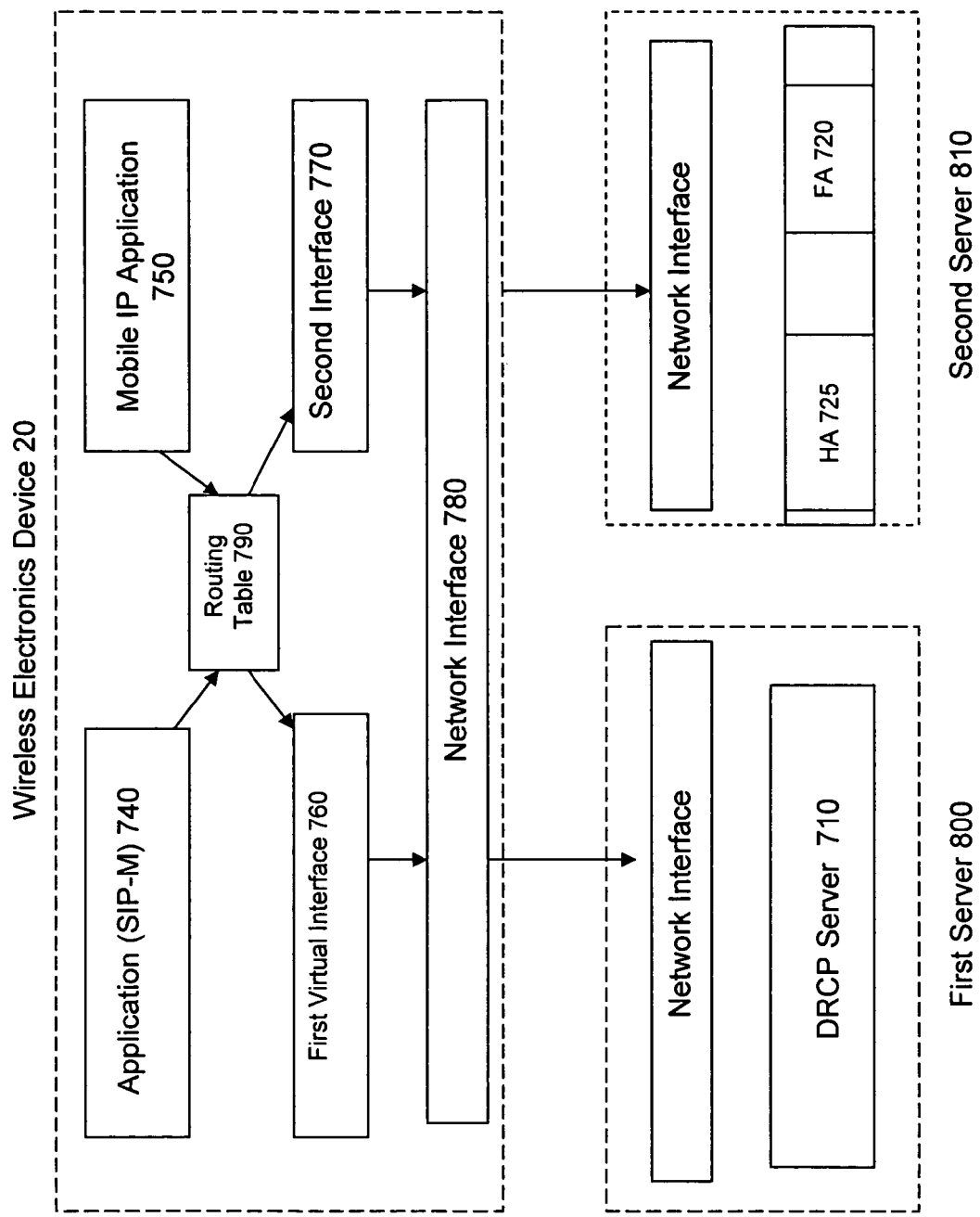
FIG. 8(b) illustrates the outbound transmission of packets from a wireless electronic device to a foreign agent residing on a first server and a URP/DRCP server residing on a second server accordingly to an embodiment of the present invention.

FIG. 8(b) illustrates the outbound transmission of packets from a wireless electronic device to a foreign agent residing on a first server and a DRCP server residing on a second server accordingly to an embodiment of the present invention. The first server 800 may include or serve a DRCP server 710 and a second server 810 may include or serve a foreign agent 720. In this embodiment, the DRCP server 710 may have a first IP address and the foreign agent 720 may have a second IP address.

As discussed above, applications 740 established utilizing the SIP-M protocol may transmit the packets or datagrams through a first virtual interface 760 to the physical interface 780. Applications 740 established utilizing the SIP-M protocol may be bound to a given IP address for the wireless electronic device 20 to ensure that the correct source IP address is on the application's packets. Mobile-IP applications 750 may transmit the packets or datagrams through a second interface 770 to the physical interface.

In the embodiment where the DRCP server 710 and the home agent 725 are located in a first server 800 and a second server 810, respectively, a routing table 790 located in the wireless electronic device 20 may determine the next hop of the datagrams or packets transmitted from application 740 established utilizing the SIP-M protocol. After the routing table 790 has received the datagrams or packets, the routing table 790 may identify the next hop that the datagrams or packets may take. In this embodiment, the next hop may be the first server 740, which serves the DRCP server 710. Unlike the case where the DRCP server 710 and the foreign agent 720 reside on a common physical server, the packets or datagrams from the application 740 established utilizing the SIP-M protocol may not be transmitted out the default gateway because they would be transmitted to the IP address of the server serving the foreign agent 720 and would not be understood. In order to eliminate this potential problem, a SIP-M routing table entry may be added to provide a path for the datagrams or packets that are sent out the first virtual interface 760 after the packets or datagrams are created by applications established by utilizing the SIP-M protocol 740. As illustrated by the routing table of FIG. 9(b), the SIP-M routing table 790 may include an extra entry where the destination address is the address of the corresponding host (not shown), e.g., IP address 102.2.45.66, and the gateway that the packets may use is the IP address of the first server 800, e.g., 100.100.100.1, where the first server hosts the DRCP server 710. Thus, packets or datagrams transferred out of the first virtual interface 760 by an application 740 may be transmitted to the first server 800. For applications 740 established utilizing the SIP-M protocol, during the invitation stage, a host-specific route may be inserted into the routing table 790 for each communication session with a corresponding host. The application 740 established utilizing the SIP-M protocol itself may be isolated from performing this task by allowing the task to occur during the SIP invitation/request. Under certain operating conditions, the addition or removal of the corresponding host's IP address and routing information may be implemented within the SIP INVITE and BYE message handlers.

A Mobile-IP application 750 may transmit packets or datagrams through a second interface 770 and through a physical interface 780. The routing table 790 may identify the next hop that the Mobile IP application packets or datagrams may take. In this embodiment, the next hop for Mobile-IP application packets may be the second server 810, which serves the foreign agent 720. Because the foreign agent 720 is not located on the same server with the DRCP server 710, the foreign agent 720 has a second IP address that is not the same as the IP address of the first server 800. In some cases, the routing table 790 may not have a destination address entry corresponding to the corresponding host's IP address, and the packets or datagrams may be transmitted to the default gateway, which in this embodiment is the IP address of the second server 810, which is where the foreign agent 720 is hosted. In other cases, the routing table 790 may have a destination address corresponding to the corresponding host's IP address and the packets or datagrams may be transmitted to the gateway corresponding to the destination address.

Figure 10A:
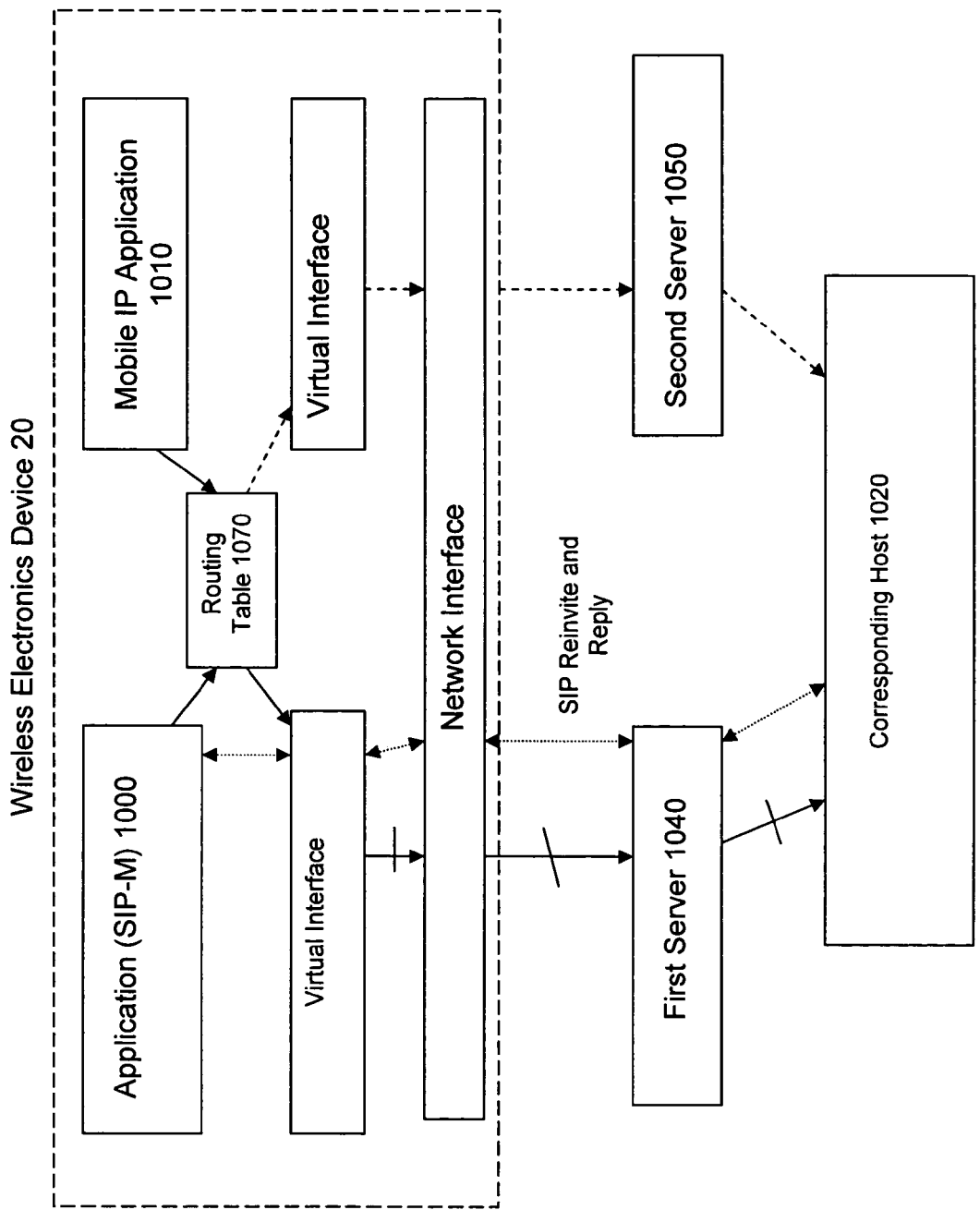
FIG. 10(a) illustrates the communication between a wireless electronic device and a corresponding host when a second application attempts to communicate with the corresponding host after a first application has an established communication.

FIG. 10(a) illustrates the communication between a wireless electronic device and a corresponding host if a second application attempts to communicate with the corresponding host when a first application has an established communication according to an embodiment of the present invention. Under certain operating conditions, the IP target address for communications from Mobile IP application 1010 and the application established utilizing SIP-M 1000 may be the same IP address. In other words, a Mobile IP application 1000 may have an existing communication with a corresponding host 1020 and an application established utilizing SIP-M 1000 may be attempting to reach the same corresponding host 1020. The resolution of this situation may depend on which application, i.e., the Mobile IP application or the application established utilizing SIP-M, established communication first.

Under certain operating conditions, the wireless electronic device 20 may have an established connection under an application established utilizing the SIP-M protocol 1000. In the embodiment of the invention where the DRCP server (not shown) is served from a first server 1040 with a first IP address and the foreign agent (not shown) is served from a second server 1050 having a second IP address, the first IP address of the first server 1040 may have been inserted into the routing table 1070 in the wireless electronic device 20 as the gateway for packets or datagrams being sent to the corresponding host 1020. If a Mobile IP application 1010 then desires to establish a data connection with the corresponding host 1020, the SIP-M routing table entry may be removed from the routing table. In other words, the routing table entry indicating that the next hop for datagrams or packets being sent to the corresponding host 1020 is first IP address of the first server 1040 may be removed from the routing table 1070. If the SIP-M routing table entry is not removed, then packets or datagrams transferred utilizing the Mobile IP application 1010 may be transferred to the first IP address, which is the first server 1040 that houses the DRCP server. Because the Mobile IP application 1010 needs to utilize a constant IP address throughout a communication session, the Mobile IP application 1010 cannot utilize the first server 1040 IP address.

In this embodiment, the application established utilizing the SIP-M protocol 1000 may be notified to re-invite the corresponding host 1020 to a new IP address, i.e., the second IP address of the second server 1050 housing the foreign agent 720. In other words, the application established utilizing the SIP-M protocol 1000 may be established with the IP address of the Mobile IP foreign agent in the second server. The application established utilizing the SIP-M protocol 1010 may see this as if the DRCP address, i.e., the first address of the first server 1040, had changed during a handoff.

If the Mobile IP application 1010 on the wireless electronic device 20 utilizing the data connection no longer is in connection with the corresponding host 1020 and hence the corresponding host's IP address, the application established utilizing the SIP-M protocol 1000 may be notified that the Mobile IP application is no longer utilizing the corresponding host's 1020 IP address. Based upon this notification, the corresponding host's 1020 IP address may be inserted back into the routing table 1070 with the gateway, i.e., next hop, for the packets or datagrams being set as the first IP address of the first server 1040. Thus, the application established utilizing the SIP-M protocol 1000 may be able to utilize the first virtual interface, e.g., the SIP-M virtual interface, rather than routing the calls through the second interface, e.g., the Mobile IP interface.

If the Mobile IP application 1010 is the first Application that has established communication with the corresponding host 1020, then the application established utilizing the SIP-M protocol 1000 may not add a routing table entry into the routing table 1070. Because the new routing table entry may not be added, packets or datagrams transmitted from the application established utilizing the SIP-M protocol may be transferred through the second interface to the second server 1050. In other words, the packets or datagrams would utilize the path that the packets or datagrams transmitted from the Mobile IP application is using.

The wireless electronic device 20 may determine if an active connection is taking place with the corresponding host's 1020 IP address by checking an address table located in the wireless electronic device 20 before the IP address is to be added or inserted to the routing table 1070. The address table may be dynamically managed by driver/software code that is monitoring network/LAN connections. In other words, the address table may identify what active connections are in place through the network 102 that involve the wireless electronic device 20.

Under certain operating conditions, the wireless electronic device may not be able to obtain an IP address from either a DRCP server or from a foreign agent when it enters a foreign subnetwork. This may occur because these services are not available or not operating correctly within the subnetwork. For example, the lifetime field in the last received ICMP router discovery packet has expired or the wireless electronic device 20 is past due in receiving an ICMP router discovery packet. In other words, the wireless electronic device 20 may not have communications with a DRCP server or with Mobile IP home agent or foreign agent.

Under these operating conditions, the wireless electronic device 20 may transmit a solicitation utilizing both the SIP-M protocol and the Mobile IP protocol. For example, the wireless electronic device 20 may transmit a mobile IP agent solicitation and a DRCP solicitation because either solicitation may result in the wireless electronic device 20 receiving an advertisement from either a Mobile IP foreign agent or a DRCP server.

If the wireless electronic device 20 does not receive an advertisement, i.e., either a mobile IP agent advertisement or a DRCP advertisement or another mechanism indicating a change of connection, in response to its solicitation, the wireless electronic device 20 assumes that it is no longer in its home subnetwork. The wireless electronic device 20 may then configure itself, or receive an IP address utilizing Dynamic Host Configuration Protocol (DHCP).

Once the wireless electronic device 20 has established its IP address by the utilization of DHCP, packets or datagrams utilizing the first virtual interface, i.e., the SIP-M virtual interface, may proceed as discussed previously. The wireless electronic device may register its IP address with the SIP registrar and be authenticated. In other words, the packets or datagrams from applications established utilizing the SIP-M protocol may proceed by exiting the wireless electronic device 20 via the gateway identified in the routing table for the corresponding host that is receiving the packets or datagrams.

Once the wireless electronic device 20 has established its IP address, packets or communications utilizing the Mobile IP virtual interface, i.e., Mobile IP application packets or datagrams, utilize the DHCP IP address as its Care Of Address. In other words, the wireless electronic device 20 may notify the home agent in the home subnetwork of the newly established care-of address, i.e., the DHCP address. Any packet or datagram received from the home agent in the home subnetwork may be decapsulated by the wireless electronic device 20 itself. The packets or datagrams are then passed to the Mobile IP applications in their original form, i.e., the packets or datagrams have the wireless electronic device home IP address, from the home network, as the destination address.

Once a foreign agent or home agent Mobile IP advertisement or a DRCP advertisement is received on the foreign subnetwork, the wireless electronic device 20 may not utilize the IP address it received utilizing DHCP. The wireless electronic device 20 may retrieve its IP address from the methods described above, i.e., utilizing the DRCP server and the Mobile IP's home agent and foreign agent advertisement.

Under certain operating conditions, the foreign subnetwork may not allow packets that did not originate on its subnetwork to be transmitted through the router on its subnetwork. Packets or datagrams in the Mobile IP application may still utilize the IP address it established on its home subnetwork as the source address. In some cases, the packets or datagrams sent by the mobile IP application may reach a router on the foreign subnetwork and the packets or datagrams may be dropped by the router because the packets or datagrams did not originate on the foreign subnetwork, i.e., they originate at the wireless electronic device 10 or 20 which is utilizing the IP address on its home subnetwork.

In order for the packets to be forwarded to the corresponding host, the packets or datagrams may be "reverse-tunneled" through the home agent on the home subnetwork. The packets or datagrams may be transmitted through the second virtual interface to the default gateway identified in the routing table. The default gateway may be the foreign agent located in the first node server. The foreign agent may have been configured to utilize reverse tunneling. If the foreign agent is configured to utilize reverse tunneling, the foreign agent may receive the packets or datagrams and may encapsulate the packets or datagrams to create encapsulated packets or datagrams, and then may output the encapsulated packets. The encapsulated packets or datagrams may now have source addresses of an IP address in the foreign subnetwork. This may allow the router to permit the encapsulated packets or datagrams to pass through the router. The destination address may be the IP address of the home agent on the home subnetwork, i.e., the original subnetwork. The home agent, through the reverse tunnel, may receive the encapsulated packets or datagrams, and may deencapsulate the encapsulated packets or datagrams to recover original packets or datagrams which have the wireless electronic device home IP address as the source address and the corresponding host's IP address as the destination address. The delivery of the original packets and datagrams may be handled utilizing normal routing methods.

The present invention provides the ability for a wireless electronic device to run applications established utilizing the SIP-M protocol and applications running the Mobile-IP protocol. The invention allows the wireless electronic device to roam from a home subnetwork to a foreign subnetwork and continue the run the application. The wireless electronic device includes a first application to output a first packet through a first virtual interface as a wireless electronic device moves from a home subnetwork to a foreign subnetwork. The wireless electronic device also includes a second application utilizing the Mobile Internet Protocol (Mobile IP protocol) to output a second packet through a second interface as the wireless electronic device moves from the home subnetwork to the foreign subnetwork. A common physical interface is tied to the first virtual interface and the second interface of the wireless electronic device, wherein the physical interface of the wireless electronic device receives the first packet and the second packet, and outputs the first packet and the second packet from the wireless electronic device after the wireless electronic device has moved.

While the description above refers to particular embodiments of the present invention, it should be readily apparent to people of ordinary skill in the art that a number of modifications may be made without departing from the spirit thereof. The accompanying claims are intended to cover such modifications as would fall within the true spirit and scope of the invention. The presently disclosed embodiments are, therefore, to be considered in all respects as illustrative and not restrictive, the scope of the invention being indicated by the appended claims rather than the foregoing description. All changes that come within the meaning of and range of equivalency of the claims are intended to be embraced therein.

What is claimed is:

1. A wireless electronic device which is roaming into a foreign subnetwork from a home subnetwork, comprising:
   a first application established utilizing Session Initialization Protocol—Mobile (SIP-M) to output a first group of packets through a first virtual interface during and after the wireless electronic device moves from the home subnetwork to the foreign subnetwork;
   a second application utilizing a Mobile Internet Protocol (Mobile IP protocol) to output a second group of packets through a second interface during and after the wireless electronic device moves from the home subnetwork to the foreign subnetwork;
   a common physical interface coupled to the first virtual interface and the second interface of the wireless electronic device, wherein the common physical interface of the wireless electronic device receives the first group of packets and the second group of packets; outputs the first group of packets to the first server at a first IP address corresponding to a first server housing an Internet Protocol (IP) address server having a first IP address, and outputs the second group of packets to a second server at the second IP address from the wireless electronic device, a common physical server including both the IP address server and the foreign agent; and
   a routing table to determine a first next hop of the first group of packets or a second next hop of the second group of packets, the routing table including a default route with a third IP address of a third server, and an address resolution protocol (ARP) table entry is inserted into the routing table which maps the third IP address to a second server MAC address,
   wherein the first IP address is equal to the second IP address and the first next hop is the same as the second next hop.

2. A system for operating a mobility communications system in a foreign subnetwork, comprising:
   a first server housing an Internet Protocol (IP) address server having a first IP address, the IP address server being one of a Dynamic Resource Communication Protocol (DRCP) server and a Dynamic Host Communication Protocol (DHCP) server;
   a second server housing a foreign agent having a second IP address, the first server and the second server being in a common physical server; and
   a wireless electronic device that has roamed into the foreign subnetwork including,
      a first application established utilizing Session Initaition Protocol—Mobile (SIP-M) to output a first group of packets through a first virtual interface during and after the wireless electronic device moves from a home subnetwork to the foreign subnetwork,
      a second application utilizing a Mobile Internet Protocol (Mobile IP protocol) to output a second group of packets through a second interface during and after the wireless electronic device moves from the home subnetwork to the foreign subnetwork,
      a common physical interface coupled to the first virtual interface and the second interface of the wireless electronic device, wherein the common physical interface of the wireless electronic device receives the first group of packets and the second group of packets, outputs the first group of packets to the first server at the first IP address, and outputs the second group of packets to the second server at the second IP address, and
      a routing table in the wireless electronic device to determine a first next hop of the first group of packets or a second next hop of the second group of packets,
   wherein the first IP address is equal to the second IP address, and the first next hop is the same as the second next hop, and the wireless electronic device has as a default route a third IP address of a third server and upon registration with the second server, an address resolution protocol (ARP) table entry is inserted into the routing table which maps the third IP address to a second server MAC address.

3. A method to transmit packets from a wireless electronic device to a corresponding host, comprising:
- transmitting packets from a first application in the wireless electronic device through a first virtual interface, the first application established utilizing Session Initialization Protocol—Mobile (SIP-M);
- transmitting packets from a second application utilizing Mobile-Internet Protocol (Mobile-IP) in the wireless electronic device through a second interface;
- moving the wireless electronic device from a home subnetwork to a foreign subnetwork;
- continuing to transmit the packets from the first application in the wireless electronic device through the first virtual interface and from the second application through the second interface in the wireless electronic device;
- receiving the first group of the packets and the second group of the packets at a common physical interface in the wireless electronic device;
- determining, utilizing a routing table, a first next hop for the first group of packets or a second next hop for the second group of packets;
- outputs the first group of packets to a first server at a first IP address;
- outputs the second group of packets to a second server at a second IP address;
- creating a default route having a third IP address for a third server; and
- inserting an address resolution protocol (ARP) table entry into the routing table which maps the third IP address of the third server to a second server MAC address, wherein the first server and the second server reside in a common physical server, the first IP address is eaual to the second IP address, and the first next hop is the same as the second next hop.

4. The method of claim 3, wherein the first application binds to a first virtual address before transmitting the packets in order for the packets' source address to be modified with an address corresponding to a Dynamic Communication Resource Protocol (DRCP) server Internet Protocol (IP) address.

5. The method of claim 3, wherein continuing to transmit the packets from the first application in the wireless electronic device includes the wireless electronic device reestablishing a SIP-M connection with the corresponding host by notifying the corresponding host of the wireless electronic device's new IP address.

6. The method of claim 3, wherein continuing to transmit the packets from the second application in the wireless electronic device includes the wireless electronic device notifying a home agent in the home subnetwork of a foreign agent's IP address in the foreign subnetwork and establishing the foreign agent's IP address as a care-of address (COA).

7. A program code storage device to transmit packets from a wireless electronic device to a corresponding host, comprising:
- a machine-readable storage medium; and
- machine-readable program code, stored on the machine-readable storage medium, the machine-readable program code having instructions which when executed cause the wireless electronic device to:
- transmit packets from a first application in the wireless electronic device through a first virtual interface, the first application established utilizing Session Initialization Protocol—Mobile (SIP-M),
- transmit packets from a second application utilizing Mobile-Internet Protocol (Mobile-IP) in the wireless electronic device through a second interface,
- move the wireless electronic device from a home subnetwork to a foreign subnetwork, and
- continue to transmit the packets from the first application in the wireless electronic device through the first virtual interface and from the second application through the second interface in the wireless electronic device;
- receive the first group of the packets and the second group of the packets at a common physical interface in the wireless electronic device;
- determine, utilizing a routing table, a first next hop for the first group of packets or a second next hop for the second group of packets;
- outputs the first group of packets to a first server at a first IP address;
- outputs the second group of packets to a second server at a second IP address;
- create a default route having a third IP address for a third server; and
- insert an address resolution protocol (ARP) table entry into the routing table which maps the third IP address of the third server to a second server MAC address, wherein the first server and the second server reside in a common physical server, the first IP address is equal to the second IP address, and the first next hop is the same as the second next hop.

8. The program code storage device of claim 7, wherein the instructions for continuing to transmit the packets from the first application in the wireless electronic device includes reestablishing a SIP-M connection with the corresponding host by notifying the corresponding host of the wireless electronic device's new IP address.

9. The program code storage device of claim 7, wherein the instructions for continuing to transmit the packets from the second application in the wireless electronic device includes notifying a home agent in the home subnetwork of a foreign agent's IP address in the foreign subnetwork.

* * * * *